April 23, 1968   A. J. WOOD ETAL   3,379,846
ELECTRODES FOR ELECTRIC DEVICES OPERABLE IN A VACUUM
Filed April 14, 1965

INVENTORS
ALAN JOHN WOOD
KENNETH WILLIAM BROWN
BY
*Buckman and Archer*
THEIR ATTORNEYS

3,379,846
ELECTRODES FOR ELECTRIC DEVICES OPERABLE IN A VACUUM

Allan John Wood and Kenneth William Brown, Stafford, England, assignors to The English Electric Company Limited, London, England, a British company
Filed Apr. 14, 1965, Ser. No. 448,219
Claims priority, application Great Britain, Apr. 21, 1964, 16,529/64
8 Claims. (Cl. 200—144)

ABSTRACT OF THE DISCLOSURE

An electrode for use as a contact of a vacuum circuit interrupter or as an electrode of a vacuum spark gap device has an arcing tip and an integral body part which may be attached to a copper, silver or gold stem. The arcing tip comprises a sintered compact of nickel plated tungsten particles infiltrated with a copper zirconium alloy and the integral body part consists of copper zirconium alloy. An alternative refractory metal, such as molybdenum, rhenium, niobium, or tantalum may be used instead of tungsten to form the sintered compact; any other reactive metal (e.g. titanium or thorium), that is a metal which provides a gettering action, may be alloyed with copper in place of zirconium, and gold or silver may be substituted for the copper component of the alloy.

A process for producing such an electrode is also disclosed.

---

This invention relates to electrodes for electric circuit interrupters and for vacuum spark gap devices.

According to this invention in one aspect, there is provided an electrode having an arc-supporting region, wherein said region comprises particles of a refractory metal incorporated with an alloy of a reactive metal and a high-purity metal chosen from the group consisting of copper, silver and gold.

According to this invention in an other aspect, a process of producing an electrode comprises the steps of sintering particles of a refractory metal to form a compact and infiltrating the compact with an alloy of a reactive metal and a high-purity metal chosen from the group consisting of copper, silver and gold.

Figure 1:
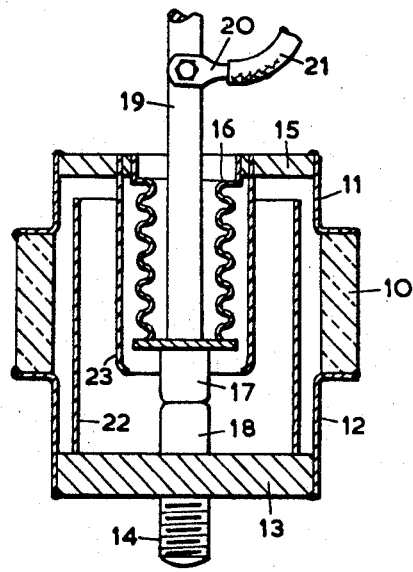
Figure 2:
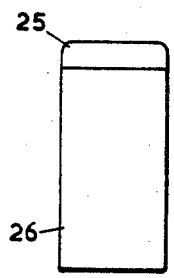
Figure 3:
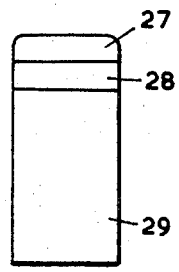

Preferred forms of the invention will now be described by way of example with reference to the accompanying drawings, in which:

FIG. 1 shows a schematic view of a vacuum interrupter;
FIG. 2 shows an enlarged view of one form of contact for the vacuum interrupter of FIG. 1; and
FIG. 3 shows an enlarged view of another form of contact for the vacuum interrupter.

Referring to FIG. 1 the vacuum circuit interrupter has a sealed envelope of metal and ceramic construction, including a hollow cylindrical ceramic insulator 10 to which metal cylinders 11, 12 are sealed at opposite ends. The cylinder 12 has welded to it a small baseplate 13 with an integral stud 14 which serves as one terminal of the interrupter. A metal ring 15 as welded to the cylinder 11 and a vacuum-tight bellows 16 extends between the central opening in this ring 15 and a moving contact 17, and is welded both to the ring and to the moving contact. The latter co-operates with a fixed contact 18 attached to the baseplate 13. The contact 17 is provided with a control rod 19 operated by an actuator (not shown). A flexible lead 21 from the other terminal of the interrupter is connected to the control rod 19 by a cable lug 20. In order to prevent deposition of conductive material on the insulator 10 due to condensation of metallic vapour or due to sputtering a metal shield 22 is interposed between it and the contacts 17, 18. A similar shield 23 surrounds the bellows 16 to prevent its deterioration due to arc running.

Referring to FIG. 2 there is shown a contact, suitable for use as the moving contact 17 or the fixed contact 18. The contact has two parts, an arcing tip 25 and a body 26. The arcing tip consists of a sintered compact of tungsten particles onto which has been cast a zirconium copper alloy, as will be described below, and the body consists of zirconium copper alloy. The arcing tip and the body are thus integral with one another, and the sinter is an integral part of the arcing tip.

The arcing surface is therefore refractory and has tungsten particles uniformly distributed and sintered together to a predetermined density. The tungsten particles are fully wetted by the zirconium copper alloy, by the use of nickel as will be described below; the zirconium is distributed throughout the matrix in solid solution in the copper, and is also present as islands of $ZrCu_3$ eutectic between the tungsten particles.

The presence of zirconium at the contact surface provides a gettering action in operation of the circuit interrupter, cleaning up gases which have been desorbed from the switch components during arcing and, by combining with them, changing them into stable solids having no adverse effect on the vacuum. The zirconium is replaced at each operation of the switch by the formation of a new surface layer as a result of the erosion of arcing surface which occurs during arcing. The contact metals are very low in gas, and in gas-forming impurity content, which also helps to maintain the vacuum during the life of the interrupter.

An alternative form for the contact 17 or 18 is shown in FIG. 3. In this form the contact is formed with a tip 27 and integral body part 28, the composition of which is the same as that of the tip 25 and the body 26 respectively of the contact described above, and is also formed with a stem 29 composed of copper and brazed or otherwise attached to the body part 28.

The arcing tips and body parts of the contacts described with reference to FIGS. 2 and 3, and electrodes for vacuum spark gap devices, are preferably manufactured by the following process.

Oxygen-free high-conductivity copper is purified by, for example, twelve zone-refining passes in argon and at least two zone-refining passes in vacuum. This high-purity copper is used to make an alloy of 99.5 percent copper and 0.5 percent zirconium by vacuum-melting.

Tungsten powder size —60 +200 BSS (approximately 0.003–0.010 inch 76–250 microns) is electroplated with nickel in amount 0.2 to 2.0 percent by weight of the tungsten. The nickel-plated tungsten particles are compacted in a press at 5 to 20 tons/sq. in. to form disc-shaped compacts, and are then sintered at 1200° C. to 1400° C. in a pure dry hydrogen atmosphere for 30 to 90 minutes.

By varying the particle size, compaction pressure, and sintering conditions, the density of the compact, and thus the percentage of tungsten in the finished arcing tip, could be varied. The latter has been varied between 60 percent and 95 percent by weight of the arcing tip.

The tungsten compacts were infiltrated with the zirconium copper alloy by placing the tungsten compacts in pure graphite molds and placing suitable amounts of zirconium copper alloy on the compacts. The molds were then inductively heated in vacuum by radio-frequency currents to a temperature of 1100° C. to 1200° C. and were held at this temperature for about 20 minutes. During this period the zirconium copper alloy melts and infiltrates the tungsten compact.

The quantity of zirconium copper alloy placed on the compact depends on whether the body part 26, 28 of the contact is to be wholly of zirconium copper alloy as shown in FIG. 2 or whether the stem is to consist in part of copper brazed or otherwise fixed to a short zirconium copper part as in FIG. 3. The amount of the zirconium copper alloy, in addition to that required for infiltration of the compact to form the arcing tip 25, 27, will, of course, depend on the size of the body part 26, 28 that is required.

The contacts may then be shaped by normal machining methods.

The process described will give a contact with a tungsten content of the arcing tip of from 75–85 percent by weight. By suitable variations of particle size and distribution, compaction pressure and sintering conditions, the proportion of tungsten in the tip 25 or 27 may be varied between 60 and 95 percent.

Although tungsten has been described as the refractory metal in the preferred embodiment, other refractory metals may be used, including molybdenum, rhenium, niobium and tantalum. In addition, although zirconium copper alloys have been described, alloys of copper with other reactive metals may be used. A reactive metal is one which provides a gettering action. Examples are titanium and thorium. When zirconium is used suitable alloys contain from 0.2 percent to 5 percent zirconium, the remainder being copper.

Addition of nickel may be made in other ways than by electroplating tungsten particles. For example nickel power may be mixed with the tungsten particles, or nickel power may be added as a layer on top of the compact during the vacuum casting process.

Although in the preferred embodiment infiltration of the tungsten compact takes place in vacuum it may take place in an inert gas or in a hydrogen atmosphere.

In the embodiment described the contacts are of the butt type. However contacts of almost any form may be produced e.g. in the form of buttons rings and rods.

Where infiltration is carried out in an inert gas or hydrogen atmosphere, rigorous vacuum conditioning of the contact is required in order to remove residual gases.

Electrodes similar to the contacts described above may be used in vacuum spark gap devices in which the electrodes are in fixed relation to one another. Such vacuum spark gap devices are used in connection with lightning diverters.

Instead of copper, another suitable metal may be used such as silver or gold.

The proportion of refractory metal when a metal other than tungsten is used, e.g. molybdenum, will be the same as described above for tungsten. Likewise the proportion of reactive metal, when a metal other than zirconium is used, e.g. titanium, will be the same as described above for zirconium, except that in the case of a silver titanium alloy the proportion of titanium will be limited to about 1.0 percent by its low solubility in silver. For this reason the use of zirconium is preferred to titanium in the silver alloy.

It will be noted that the weight percentage of the refractory metal is given as the percentage of the total of the arcing tip, the remainder of the arcing tip consisting of the alloy (and the small amount of nickel where this is present); on the other hand the percentage of the reactive metal is given as the percentage by weight of the alloy.

What we claim as our invention and desire to secure by Letters Patent is:

1. In a vacuum switch, or the like, an electrode having an arc-supporting region consisting of sintered particles of a refractory metal selected from the group consisting of tungsten, molybdenum, rhenium, nibium and tantalum, infiltrated with a melted alloy of a reactive metal and a high-purity metal, the reactive metal being selected from the group consisting of zirconium and titanium and the high-purity metal being selected from the group consisting of copper, silver and gold.

2. In a vacuum switch, or the like, according to claim 1, wherein the arc-supporting region includes nickel as a wetting agent on the particles of refractory metal.

3. In a vacuum switch, or the like, according to claim 1, wherein the refractory metal is tungsten in an amount in the range of from about 60 to about 95 percent by weight of the material comprising the arc-supporting region.

4. In a vacuum switch, or the like, according to claim 1 wherein the reactive metal is zirconium in an amount in the range from about 0.2 to 5 percent by weight of the melted alloy.

5. In a vacuum switch, or the like, according to claim 3, wherein the arc-supporting region includes nickel, the nickel enclosing the particles of tungsten.

6. In a vacuum switch, or the like, according to claim 5, wherein the amount of nickel is in the range of from about 0.2 to 2.0 percent of the weight of the tungsten.

7. In a vacuum switch, or the like, according to claim 1, wherein said electrode has a body part consisting of said melted alloy.

8. In a vacum switch, or the like, according to claim 1, wherein said electrode has a stem consisting of a metal chosen from the group consisting of copper, silver and gold.

References Cited

UNITED STATES PATENTS

| 2,975,256 | 3/1961 | Lee et al. | 200—144 |
| 3,014,110 | 12/1961 | Cobine | 200—144 |
| 3,234,351 | 2/1966 | Hebb | 200—166 X |
| 3,281,563 | 10/1966 | Waterton | 200—166 |

FOREIGN PATENTS

| 236,915 | 1/1962 | Australia. |
| 537,866 | 7/1941 | Great Britain. |

ROBERT S. MACON, *Primary Examiner.*